United States Patent [19]

Seidel et al.

[11] Patent Number: 4,477,480

[45] Date of Patent: Oct. 16, 1984

[54] METHOD OF PREPARING A CLEAN FLAVORED CEREAL STARCH

[75] Inventors: William C. Seidel, Monsey; George E. Orozovich, Flushing; Darrell G. Medcalf, Chappaqua, all of N.Y.

[73] Assignee: General Foods Corporation, White Plains, N.Y.

[21] Appl. No.: 395,755

[22] Filed: Jul. 6, 1982

[51] Int. Cl.$^3$ .................. A23L 1/195; A23L 1/187
[52] U.S. Cl. .................................. 426/578; 127/38; 127/39; 127/70; 127/71; 426/579
[58] Field of Search .................. 426/578, 579, 661; 127/38, 39, 70, 71

[56] References Cited

U.S. PATENT DOCUMENTS

| | | | |
|---|---|---|---|
| 245,699 | 1/1906 | Rudel | 106/100 |
| 253,923 | 2/1882 | Hamlin | 127/70 |
| 270,210 | 1/1883 | Duff | 127/39 |
| 2,373,016 | 4/1945 | Daly et al. | 127/70 |
| 2,702,755 | 2/1955 | Chaney | 106/213 |
| 2,779,693 | 1/1957 | Pacsu et al. | 127/71 |
| 3,087,839 | 4/1963 | Hamilton | 127/38 |
| 3,102,054 | 8/1963 | Harris | 127/69 |
| 3,399,081 | 8/1968 | Bernetti et al. | 127/71 |
| 4,303,451 | 12/1981 | Seidel et al. | 127/32 |
| 4,368,212 | 1/1983 | Heckman | 426/578 |

*Primary Examiner*—Jeanette M. Hunter
*Attorney, Agent, or Firm*—J. T. Harcarik; T. R. Savoie; D. J. Donovan

[57] ABSTRACT

A method of modifying cereal starches to produce a clean, odor-free and without off-taste starch that does not develop objectional characteristics during storage. The modification process comprises an alkali treatment of the starch.

16 Claims, No Drawings

METHOD OF PREPARING A CLEAN FLAVORED CEREAL STARCH

FIELD OF THE INVENTION

This invention relates to processing starch materials to remove undesirable characteristics thereof. More particularly, a process for reducing the cost and increasing the quality of pregelatinized starches, especially those pregelatinized starches used in desserts, is disclosed.

DESCRIPTION OF THE PRIOR ART

A caustic alkali treatment of starch is known to have many beneficial results: for example, U.S. Pat. No. 253,923, issued to Hamlin, discloses that an alkali treatment facilitates the removal of glutinous matter from crude starch; U.S. Pat. No. 810,086, issued to Rudel, discloses that caustic alkali prevents microbial growth during starch processing; and U.S. Pat. No. 2,702,755, issued to Chaney, discloses a procedure involving an alkali treatment to improve the solubility of laundry starch. Daly et al, U.S. Pat. No. 2,373,016, disclosed an alkali treatment that improves cereal starch. Specifically, the Daly et al process modified a cereal starch so that the clarity and shortness of a cooked pudding made from using this starch is comparable to that of a root starch pudding. In spite of these advances, root starches, such as tapioca and potato possess desirable characteristics lacking in the cereal starches.

The prior art, however, was not concerned with the taste of cereal starches. Taste in this context includes the phenomena generally known as taste, flavor, and odor, either alone or in combination. Specifically, wheat starch has a cereal taste and corn starch has both an objectionable taste—which is characterized as "woody", "corny" or both—and a characteristic and undesirable odor. However, these off-tastes and odors either do not develop, or are masked when the raw starch is used in a cooked product, for example, in a cooked pudding. In direct contrast, these cereal starch tastes are both very noticable and objectionable in products using a pregelled starch, such as an instant pudding mix. Furthermore, the desirable economic position of cereal starches relative to non-cereal starches has created a need for improving the taste of cereal starches. In response to this need, Harris, in U.S. Pat. No. 3,102,054, discloses a process wherein the starch is washed with a aqueous-methanol-ammonia mixture. This wash permentantly removes the off-taste from cereal starches. In other testing, Harris found that treatment with either the alcohol alone or an aqueous alkaline solution, including aqueous ammonia, sodium hydroxide, potassium hydroxide, sodium carbonate, urea, as well as anhydrous ammonia, alone did not remove the off-taste from cereal starches—only the aqueous-methanol-ammonia mixture successfully removed the off-taste.

DESCRIPTION OF THE INVENTION

A homogeneous starch slurry is formed by adding sufficient starch to water so that the resulting slurry has between 18 and 45% solids. Preferably, the solids content of this slurry is between 25 and 44% and more preferably the solids content is between 35 and 43%. The starch may be any starch whose off-taste needs to be removed such as the cereal starches and sago. Preferably, the starch would be any commercially available cereal starch such as wheat, waxy maize, dent corn, or rice starches. An alkaline solution, at a concentration below the level effective to gelatinize the starch at the point of alkali addition to the starch slurry, is added to the starch slurry so as to bring the slurry pH to a level greater than 10, but not so high as to paste the starch. Preferably, the alkaline solution concentration is between about 1 and about 5%, by weight of the solution. More preferredly, the alkaline solution is between 2 and 4%. While any alkali which will raise the pH of the slurry to a greater than 10 is acceptable, it is preferred that the alkali be any food grade alkali, and more preferred that the food grade alkali be chosen from the group composed of the carbonates, phosphates, and hydroxides of the alkali metals, alkaline-earth metals, ammonium, and organic alkalis. It is most preferred that the alkali be either an alkali or an alkaline-earth metal hydroxide.

While it is necessary to add sufficient alkali to raise the pH to greater than 10, if waxy maize starch is used, it is more preferred that the pH be greater than 10.5. However, when either dent corn or wheat starches, it is more preferred that the pH be greater than 11.5. Nonetheless, it is undesirable to raise the pH above the pasting pH of the starch (a starch pasting pH is not a sharp transition, rather, especially with waxy maize starch, there is a pH range where the starch becomes progressively more viscous) used; e.g. about pH 12.4 for wheat and waxy maize starch; and about pH 12.5 for dent corn starch. It is preferred that the pH of the slurry be within about 2 pH units of the pasting pH of the starch being used, it is more preferred that the pH be within about 1 pH unit of the pasting pH, and, except for waxy maize starch, it is most preferred that the pH be within 0.5 pH units of the pasting pH. While not wishing to be bound to any particular theory, it is believed that the starch granules are opened up as the pH approaches the pasting pH so that whatever material produces the off-taste can be readily removed. Furthermore, the length of time that the starch must be kept at this elevated pH is a function of how close the pH is to the pasting pH. Thus, for dent corn with a pasting pH of about 12.5, maintaining the slurry at a pH of 10.5 for 5 hours may only marginally reduce the off-taste. However, dent corn treated at pH 11 for ½ hour removes the off-taste in some of the dent corn samples, at pH 12 the alkali treatment instantly removes the off-flavor in several samples, and at pH 12.3, the off-taste is instantly removed from almost all samples. Therefore, it is preferred that the alkaline treatment is for less than 5 hours, more preferably less than 1 hour and most preferred, less than a ½ hour. Economically, the process is optimized by reducing the length of time that the starch is maintained at an elevated pH by bringing the slurry to a pH that approaches the starch's pasting pH.

The starch is then washed, under alkaline conditions, several times using any washing method. Typically, the alkaline slurry is drained of the majority of the alkaline liquid. Thereafter, the residue may be washed by filtration, centrifugation, counter current washing, settling or a combination of these steps. After each washing, the starch is resuspended before beginning the next wash. While washing the starch several times is critical to this invention, at least four washings are preferred, and it is most preferable that the starch be washed at least five times. Furthermore, it is important that the washing procedure not lower the pH of the starch below about pH 10.

After washing, but before drying, the starch may be neutralized. Neutralization is accomplished by adding a 70 to 100%, preferably 80 to 90%, food grade acidic solution such as 85% phosphoric acid so as to reduce the pH of the reslurried starch to below pH 9, but at above pH 6, more preferably below pH 8, but above pH of 6.5, and most preferred, the starch slurry pH is kept above 7. It is preferred that the neutralizing agent be chosen from the group consisting of food grade acids and more preferred that the neutralizing agent be chosen from the group consisting of citric, hydrochloric, phosphoric, sulfuric acids and combinations thereof.

Once the starch has been alkali treated, washed, and possibly neutralized, it may then be dried. The starch would be dried by any conventional means, but it is preferred that the starch be dried by either spray drying or drum drying. The most preferred means of drying the starch is to either spray or drum dry the starch slurry in a manner to pregelatinize the starch (see U.S. Pat. No. 4,280,815 issued to Pitchon et al). Once dried, it is preferred that this off-taste free starch be combined with other ingredients so as to formulate an instant dessert mix. Typically, this instant dessert mix will be an instant pudding type, and instant icing or a whipped topping mix.

It is also within the scope of this invention to further modify the improved starch produced by this invention by any conventional physical or chemical means. For example, the clean-flavored starch of the instant invention could be hydroxypropylated either before the alkali treatment or after washing, but before drying. However, if the starch is hydroxypropylated before the alkali treatment, the pH, when the slurry is dried, should be at least 9. Furthermore, if the hydroxypropylated starch had been dried before the alkali treatment, the pH during drying should be at least 9.5.

EXAMPLE 1

A starch slurry was formed by adding 800 grams of waxy maize starch to 1.2 liters of room temperature water. The starch and water was stirred until a homogeneous slurry was formed at which point sufficient 3% sodium hydroxide was added to the slurry until the pH reached 11.0. Thereafter the pH 11 starch slurry was stirred for an additional 0.5 hours and then filtered through a Bruchner funnel. The filtrate was discarded and the filter cake was redispersed in water and then refiltered. The redispersion and refiltering steps were repeated 3 times. Thereafter, the starch was redispersed in sufficient water to make up a 35% solids, on a weight basis, slurry. The starch slurry was adjusted to a pH of 6.5 with 85% phosphoric acid and drum dried to produce a pregelatinized starch.

Twenty-three grams of the modified starch were then combined with the following ingredients:
Sugar—62 grams
Dextrose—11 grams
Hydrogenated Vegetable Oil with BHA—0.4 grams
Mixed Anhydrous Disodium Orthophosphate, and Tetrasodium pyrophyosphate—3.5 grams
Color and vanilla flavor to suit The total mixture (100 g) was thereafter combined with about 500 ml of milk. This combination was well mixed—2 minutes with low speed mixer—poured into serving dishes, and chilled for 30 minutes before serving. The pudding produced by this procedure was characterized as having no undesirable flavors.

EXAMPLE 2

A fresh, pregelatinized, but not alkali-treated, waxy maize starch was with the sugars, oil, phosphates, colors and flavors of Example 1 in the same ratios. Thereafter, the Example 2 mixture was combined with milk, mixed, and chilled, also as in Example 1. The pudding produced by this procedure was characterized as "corny".

EXAMPLE 3

A pregelatinized, but not alkali-treated, waxy maize starch, which had been stored for 3 months at 38° C., was used to make a pudding in combination with the non-starch Example 1 ingredients. Thereafter the combination was mixed and chilled. The resulting pudding was evaluated as "woody".

EXAMPLE 4

Dent corn starch, 800 grams, was slurried in 1.2 liters of room temperature water. The pH of this slurry was adjusted to 12.0 with the addition of a 3% sodium hydroxide solution. The suspension was stirred for 6 minutes after which the suspension was filtered through a Bruchner funnel. The filtrate was discarded and the filter cake was resuspended in water, and then refiltered. This washing process was repeated four times after which the starch cake was redispersed at a 35% solids level in additional water. The pH of the resuspended dent corn slurry was adjusted to 7.0 with phosphoric acid. Thereafter, the pH adjusted washed dent corn slurry was drum dried.

The modified dent corn of this example was then combined with the same dry ingredients as Example 1 and mixed with milk in the same proportion. The resulting pudding was evaluated as being free of undesirable flavor notes.

EXAMPLE 5

Wheat starch was substituted into the procedure of Example 2 instead of corn starch. The modified wheat starch, when used in making an instant pudding according to the formulation of Example 1, was evaluated as also being free of any undesirable flavor notes.

EXAMPLE 6

A dent corn starch slurry was made of by combining 363 kilograms of dent corn starch with 530 kilograms of water. After being stirred so as to form a homogeneous suspension, the slurrys pH was adjusted to 11.8 by the addition of 3% sodium hydroxide. The suspension was stirred for an additional 6 minutes after which it was filtered on a Komline-sanderson Engineering Corporation 3'×1" Rotary Vacuum Filter with a Flexibelt Discharge. The filter cake produced thereby was redispersed in water and then refiltered. This washing was again repeated three additional times.

After complete washing, the starch cake at 53% solids, was reslurried in water at a 45% solids level. This slurry was combined with a catalytic amount, 5.4 kilograms, of sodium sulphate and the pH of the slurry was adjusted to 11.8 with an effective amount of 3% sodium hydroxide. Next, propylene oxide was added so that the slurry was 10% therein and sealed in a reaction vessel for 18 hours at 80° F. Thereafter, the excess propylene glycol was removed and the pH was adjusted to 7.0 with 85% phosphoric acid and spray cook dried according to the method in U.S. Pat. No. 4,280,851. Puddings made with the starch produced by this procedure were characterized as being without off-tastes and odor-free.

EXAMPLE 7

A 40% solids dent corn starch slurry was made according to Example 4. Thereafter the starch slurry was hydroxpropylated, again according to the procedure in Example 4. After hydroxypropylation, the slurry was filtered and the filter cake was resuspended in water so as to make a 45% solids, hydroxypropylated starch slurry. The pH of this slurry was then adjusted to 11.8. Subsequently, the pH 11.8 starch slurry was filtered and resuspended five times. Following the fifth washing, the pH of the starch slurry was adjusted to 9 and then drum dried in a manner effective to pregelatinize the starch. When this starch was incorporated into a pudding, the pudding was free of off-tastes and odors.

What is claimed:

1. A process for removing the off-taste in cereal starches comprising the steps of:
   (a) dispersing and agitating a sufficient quantity of a cereal starch in water so as to form a homogenous starch slurry that is between about 18 and 45%, by weight, starch;
   (b) adding an alkali to the slurry so that the slurry pH is no more than about 2 pH units from the starch's pasting pH;
   (c) within about 5 hours of the alkali addition, removing the alkali liquid from the slurry;
   (d) repeatedly washing the starch solids with an aqueous media, wherein the aqueous media does not substantially lower the starch pH below a pH of about 10; and
   (e) drying the slurry.

2. A process according to claim 1 wherein the pH of the starch slurry after the addition of the alkali is within 1 pH unit of the starch's pasting pH.

3. A process according to claim 1 wherein the pH of the starch slurry after the addition of the alkali is within 0.5 pH units of the starch's pasting pH and the starch slurry is washed within 1 hour of the alkali addition.

4. A process according to claim 1 wherein the starch slurry is dried under conditions which gelatinize the starch.

5. A process according to claim 1 which further comprises the step of adding a neutralizing agent to the washed starch so as to adjust the starch pH so that it is above about pH 6 and below about pH 10.

6. A process according to claim 1 which further comprises the step of chemically modifying the starch.

7. A process according to claim 3 wherein the cereal starch is wheat starch and the pasting pH is about pH 12.4.

8. A process according to claim 3 wherein the cereal starch is dent corn starch and the pasting pH is about pH 12.5.

9. A process according to claim 2 wherein the cereal starch is waxy maize starch and the pasting pH is about pH 12.4.

10. A process according to claim 4 wherein the starch is pregelatinized by spray drying the neutralized starch slurry.

11. A process according to claim 4 wherein the starch is pregelatinized by drum drying the neutralized starch.

12. The product produced by the process of claim 1.

13. An instant dessert product wherein the ingredients include a pregelatinized cereal starch prepared by the process of claim 4.

14. A process according to claim 1 wherein the starch solids are washed at least four times with said aqueous media.

15. A process according to claim 1 wherein the alkali liquid is removed from the slurry within 1 hour of the alkali addition to the slurry.

16. A process according to claim 1 wherein the alkali liquid is removed from the slurry within about ½ hour of the addition of the alkali to the slurry.

* * * * *